(12) United States Patent
Simelius

(10) Patent No.: US 7,414,613 B2
(45) Date of Patent: Aug. 19, 2008

(54) METHOD FOR INTERMEDIATE UNLOCKING OF A KEYPAD ON A MOBILE ELECTRONIC DEVICE

(75) Inventor: Kim Simelius, Tampere (FI)

(73) Assignee: Nokia Corporation, Espoo (FI)

( * ) Notice: Subject to any disclaimer, the term of this patent is extended or adjusted under 35 U.S.C. 154(b) by 366 days.

(21) Appl. No.: 10/506,797

(22) PCT Filed: Mar. 4, 2002

(86) PCT No.: PCT/IB02/00623

§ 371 (c)(1),
(2), (4) Date: Feb. 16, 2005

(87) PCT Pub. No.: WO03/075585

PCT Pub. Date: Sep. 12, 2003

(65) Prior Publication Data

US 2005/0116840 A1 Jun. 2, 2005

(51) Int. Cl.
*G06F 3/02* (2006.01)
(52) U.S. Cl. ............... 345/168; 455/550.1; 341/22
(58) Field of Classification Search ... 455/550.1–575.1; 345/168–172; 341/22; H04M 1/66; H04Q 7/38
See application file for complete search history.

(56) References Cited

U.S. PATENT DOCUMENTS

| | | | |
|---|---|---|---|
| 4,845,772 A | | 7/1989 | Metroka et al. |
| 4,945,556 A | * | 7/1990 | Namekawa ................. 455/565 |
| 5,864,765 A | | 1/1999 | Barvesten |
| 6,449,492 B1 | * | 9/2002 | Kenagy et al. ............ 455/550.1 |

FOREIGN PATENT DOCUMENTS

| | | |
|---|---|---|
| EP | 0 453 089 | 10/1991 |
| EP | 0 768 786 | 4/1997 |
| EP | 0 939 533 | 9/1999 |
| JP | 09-261336 | 10/1997 |
| JP | 11355432 A * | 12/1999 |

OTHER PUBLICATIONS

User's Guide, XP002218693, Mobile Phone 1888 World, Ericsson, Oct. 1998, http:\\www.telesupport.se/manualer/mobil_man.htm.
User's Guide, XP002218694, 9353912, Issue 1, Nokia 6510, Feb. 4, 2002, http:\\www.nokia.com/phones/usersguide/results/1,23421,,00.html.

* cited by examiner

*Primary Examiner*—Alexander Eisen
*Assistant Examiner*—Kenneth B Lee, Jr.
(74) *Attorney, Agent, or Firm*—Alfred A. Freesola; Ware, Freesola, Van Der Sluys & Adolphson, LLP

(57) ABSTRACT

A method and device for changing input states of an electronic device, the device comprising an input portion and being capable of carrying out user operations, the input states comprising a locked state, where the use of the input portion is significantly restricted, and an unlocked state, where the use of the input portion is not restricted, the locked and unlocked states being respectively enterable by a locking and unlocking input. A further input state is an intermediate unlocked state in which a limited operational use of the input portion is possible; which method comprises entering the intermediate unlocked state from the locked state, based on user input; detecting termination of a user operation in the intermediate unlocked state, and entering the locked state, in response thereto. There is also provided an input controller, a keypad and a mobile electronic device implementing these features.

7 Claims, 3 Drawing Sheets

METHOD FOR INTERMEDIATE UNLOCKING OF A KEYPAD ON A MOBILE ELECTRONIC DEVICE

CROSS-REFERENCE TO RELATED APPLICATIONS

This application is for entry into the U.S. national phase under §371 for International Application No. PCT/IB02/00623 having an international filing date of Mar. 2, 2002, and from which priority is claimed under all applicable sections of Title 35 of the United States Code including, but not limited to, Sections 120, 363 and 365(c).

TECHNICAL FIELD

The present invention relates to electronic devices having input means. It also relates to mobile electronic devices having lockable input means to prevent inadvertent input.

BACKGROUND OF THE INVENTION

In many popular mobile terminals of today, the keypad can be locked when the phone is not used. There are many ways to implement the keypad lock feature, the most popular terminals using a sequence of two different key-presses to lock the keypad, and some other terminals having features like timer lock or keypad lock selection from the menu. Also, the possibly existing cover of the keypad can be used for locking, or the keypad can be locked when other input options of the electronic device are used.

It is known that the keypad of a mobile phone (or similar device) can be locked e.g. by selecting such an option from a menu or by pressing a certain key combination. The key-locks are used to prevent accidental key-presses, for example if the device is in a pocket or in a purse. However, sometimes the user would like to use the device only for one quick operation, e.g. to read a received SMS (Short Message) or to change the user profile. If the keypad is locked, in ordinary mobile terminals, the user has to unlock the keypad first, then perform the operation and in the end remember to lock the keypad again.

Prior art U.S. Pat. No. 4,845,772 (Motorola) discloses a mobile phone where the keypad is automatically locked following an operation performed by the user (closing a flip element). However, this manner of operation is tied closely to a phone containing a flip element.

Nokia patent application EP 0 939 533 discloses a semi-automatic key-lock where upon closing a sliding cover a softkey for locking the keypad appears on the screen.

Both approaches for key-locks described above have in common that they are not suitable for the use with mobile terminal devices or handheld computers that do not have slideable or flippable covers. Therefore, the above mentioned electronic communication devices fail to overcome the problems related with cover-less mobile electronic devices.

The current solutions, although providing a secure locking mechanism, hamper the use of the terminal for quick operations, while they provide the necessary key-lock function. For example, when the user wants to use the terminal for a single phone call, or if he wants to change the profile of the terminal or to read a received SMS, it is first necessary to unlock the keypad (e.g., two key-presses and a short waiting time), then maybe press a single key to perform the function (dial shortcut, select profile, show message) and after the operation, press two keys to lock the keypad or wait for the lock timeout. This cumbersome operation often leads to user's negligence that the keypad is left unlocked, this in turn perhaps leading to accidental phone calls. While the timer lock solves this problem partly, there is still the timeout period when random key-presses can initiate calls or interfere with the operation of the terminal otherwise, e.g. by terminating a call in progress or entering names into the phonebook.

SUMMARY OF THE INVENTION

It is therefore desirable to provide an input lock mechanism that can be operated faster to perform a single quick task.

It is desirable to provide a method and a device to ensure that a user does not forget to lock an electronic device after use to prevent the waste of resources.

It is desirable to have an electronic device that is capable of locking itself automatically.

According to a first aspect of the present invention, there is provided a method of changing the input state of an electronic device. The device comprises input means and is capable of carrying out user operations. The input states comprise a locked state, where the use of the input means is significantly restricted, an unlocked state, where the use of the input means is not restricted, and an intermediate unlocked state. The locked state can be entered by a locking input, and the unlocked state can be entered by an unlocking input. The method comprises the steps of entering said intermediate unlocked state based on user input, detecting the termination, completion or other ending of a user operation in said intermediate unlocked state, and entering said locked state, in response to said detection, wherein said user operation is other than said locking input. Preferably the intermediate locked state can be entered by an intermediate unlocking input.

According to this embodiment, e.g. the keypad is intermediately unlocked or cleared for user input by an intermediate unlocking input, e.g. a certain key combination, and then there is at least one or there are some predefined user input steps that can be performed. When such an operation is detected as (successfully) completed, i.e terminated, the input means is automatically re-locked again. Alternatively, when such an operation is cancelled, the input means is automatically re-locked again. Altogether, if it is detected that the operation has ended either by completing it or cancelling it, or the phone otherwise entering a state, where it can be determined that the user is not continuing the operation anymore, the input means is automatically re-locked again. In summary, there is provided an intermediate unlocked state of the input in which only a limited operational input is possible. Once said operational input is finished the device is relocked again.

The method according to an embodiment of the invention provides an intermediate unlock operation which re-locks an electronic device automatically, if a predetermined auto-locking definition is met. Preferably, the method would be used in an electronic device that offers two different unlocking modes, i.e. a general unlock, which requires a second user input to lock the electronic device (a locking input) as in the case of the known mobile telephones, and a limited unlock operation which locks the electronic device automatically if a predetermined auto-locking definition is met, the auto-locking definition being other than the locking input mentioned above. The electronic device may be configurable to offer both unlocking features simultaneously or exclusively. A user may be able to select the default unlock mode e.g. from the device settings.

According to an embodiment of the invention the method can be executed in a shortened form, e.g. if certain operations can be accessed directly. The intermediate unlock input can be a key sequence to e.g. display a message (e.g. SMS or MMS, or an e-mail), pressing the key sequence to view the message e.g. the access is limited to "read only", and following the depiction of the SMS the device locks itself automatically, i.e. either in a state of depicting the SMS or in a state of automatic return to the default display. Another example for this "fast" access can be e.g. for a mobile telephone device (MTD) user entering a change of the alarm from "tone" to "vibration", so that a user does not have to waste time for unlocking the device to silence the MTD e.g. if the user forgot to switch the sound off while watching a film in a cinema. In this particular mode, it seems to the user that the MTD can be operated without an explicit unlock code to be entered. Preferably, said limited access restricts the access to a small number of possible input operations. This limitation can be used to grant access only to a few and especially only low resource consuming operations.

According to an embodiment of the invention, the invention can be implemented e.g. as follows: a group of state traversal lists is defined that can follow the intermediate unlock input like key-presses. Only such a sequence of key-presses that can actually traverse a list are allowed to be carried out. If the user presses a key that is not assigned to the state lists at that step, the keypad is immediately locked up. This can be realised by organising the information of all the state traversal lists into a tree-like structure of states. The tree is traversed from root up by moving to the next state with each key-press, or with certain predefined key-presses. When the terminal enters a state that is a final leaf on the tree or outside the tree, the terminal is locked up again.

The internal states of the tree can include a free-text entry mode, wherein exiting the state is not defined by any number of key-presses, but instead the state is exited by selecting an operation to be carried out to the text, e.g. "send", "save" or "delete", or by cancelling the input operation, e.g. by pressing the "cancel" button on the keypad.

It is to be noted that the "freely usable" intermediate unlock sequences may be programmable by the user, thereby ensuring that the input sequence following limited unlocking is a user-specific operation.

It is to be noted, that a sign or a text on the display can be used to alert the user that the device is operating in an intermediate unlocked and/or in a limited access mode. Alternatively the method further comprises a step of indicating on the screen, that the temporary unlock feature is in use. This may be embodied by e.g. by a flashing lock sign, or a count down timer indicating the remaining intermediate unlocked time. This feature may include the depiction of available and unavailable soft-keys or menu elements.

Preferably, the method comprises the steps of receiving an input, executing said input, ending said input and re-locking the device. These steps enable the method to use an input related auto-locking definition, to activate the auto-lock automatically, e.g. after a predetermined input. The predetermined input can be e.g. defined by a finally executed action, like changing a configuration, executing a single telephone call, reading and deleting or even answering an SMS. This embodiment of the invention offers a method to unlock the terminal keypad, operate the terminal for just a few consecutive and operationally related functions using the keypad, and have the terminal lock up its keys immediately following the last related key-press.

Advantageously, said intermediate unlocked state restricts the access to a subgroup of the user operations that can be carried out. This means that the electronic device unlocks only for predefined actions to be executed in the intermediate unlocked state. So e.g. a fast two step intermediate unlock input may only grant access to the basic functions of the mobile telephone. In the case of a mobile telephone the basic functions can be e.g. the telephone operability, for people using a mobile telephone like a "portable" call box. For people using their mobile phone more like a PDA (Personal Digital Assistant), the basic functionality can be e.g. the calendar or timer functionality. The electronic device can offer the option of a selective basic functionality, so a user may select e.g. via a menu which basic functionality is accessible in the intermediate unlocked state. The unlocking only for predefined actions can be executed in dependence of the operation state of the electronic device. For example, the possibility to read a SMS message could be added to the list of accessible operations only when there is actually an unread SMS message.

According to a preferred embodiment of the present invention the termination or ending of the user operation is one of the group: completing the user operation, cancelling the user operation, detecting the idleness of user input and detecting an unexpected user input.

The locked state in an electronic device can be entered by the steps of: detecting idleness or the absence of user input, and entering the locked state. This locking operation may be operated in the unlocked state and the intermediate unlocked state of the electronic device.

The locked state in an electronic device can be entered by the steps of: detecting unexpected user input, and entering the locked state. This locking operation can be operated in the unlocked state and the intermediate unlocked state of the electronic device.

This embodiment of the present invention can be used, e.g. in connection with standard key-unlock functionality, and may be switched on and off via the menu "settings" of the electronic device. This functionality enables e.g. to detect if an input is caused by an intelligent and authorised user or if it seems to follow a more or less arbitrary input pattern. This feature is easy to implement, as e.g. mobile telephones and other electronic devices can recognise a valid and invalid input and signalise the acceptance or the rejection of an input with different sound signals. So an invalid input counter can e.g. be connected with the key-unlock functionality, to reactivate the key-lock at the first, second or third invalid input. The "invalid" input counter may be reset at each first, second or third valid input or according to a timer.

Conveniently, said detection of termination or ending of the user operation is defined by a predetermined number of input operations. The locked state is entered after e.g. a predetermined number of input operations and/or to a defined number of executed operations. The determined number can be a fixed natural number or the number can be related to the respective operation. So the input need not only be restricted to certain kinds of input but can e.g. be restricted to the execution of a single operation.

Advantageously, said detection of ending of the user operation is time related. The access in the intermediate unlocked state can be time limited as in the case of timer related auto-locking functionality. The time related intermediate unlocked state can provide an additional safety element to prevent e.g. unintentional inadvertent dialling. So a telephone can enter the locked state in both cases: if e.g. a timer runs out, or if the end of a user operation is detected. The time relation of the intermediate unlocked state can be e.g. an absolute time relation, like a timer started with the detection of the intermediate unlocking input, that is only reset in the case of a re-locking of the device. Such a timer is related to the intermediate unlocking operation and may have a run time of e.g. 5 min. The timer may be reset at any input. Such a timer is related to the intermediate unlocked state and can comprise a time interval of e.g. a few seconds or a few tens of seconds.

Preferably said intermediate unlocking input required for entering said intermediate unlocked state, i.e. a certain key sequence, is different from the unlocking input required for entering the unlocked state, and is also different from the locking input required for entering the locked state. So it is at least one predetermined key sequence. Preferably there are more than one key sequences for intermediately unlocking the device for a variety of intermediate unlocked states, e.g. one predetermined key sequence for entering an SMS reading intermediate unlocked state, and another key sequence for entering an SMS compose intermediate unlocked state.

According to another aspect of the present invention, a software tool for carrying out the method for entering a locked state from an intermediate unlocked state, upon detecting of a termination or an ending of a user operation, of an electronic device is provided, which comprises program code means for performing all of the steps of the preceding description when said program is run on a computer or a network device.

According to another aspect of the present invention, a computer program for carrying out the method for entering a locked state from an intermediate unlocked state, upon detecting an ending of a user operation, of an electronic device is provided, which comprises program code means for performing all of the steps of the preceding description when said program is run on a computer or a network device.

According to yet another aspect of the invention, a computer program product is provided comprising program code means stored on a computer readable medium for carrying out the method for entering a locked state from an intermediate unlocked state of an electronic device upon detecting the ending of a user operation, of the preceding description when said program product is run on a computer or a network device.

According to yet another aspect of the invention, an input controller for an electronic device is provided, for changing the input state of an electronic device. The input controller comprises: means to operatively connect an input means to said input controller, means to operatively connect a computing means of an electronic device to said input controller, means to enter the intermediate unlocked state based on user input, means to detect the termination or ending of a user operation, and means to lock said input means in accordance with said detected termination or ending of a user operation.

An input controller is a hardware (or software) device operatively connected between input means and the executing (processing) means of an electronic device, e.g. to convert the signals from single keys of a keypad to computable digital code. The input controllers of computers can be found e.g. in the keyboard as a piece of hardware and in the computer as a piece of software. The input controller can e.g. lock a keyboard according to a certain input, as it is capable of pre-processing expected keypad input. The input controller can e.g. lock a keyboard according to a certain input from the computing means. The input processing capability enables the input controller to perform the entering of the intermediate unlocked state based upon user input, and to check input for the termination or the ending of a user operation and lock the keyboard by itself, without the need to request the processing means of the electronic device. The input means can be integrated in an electronic device. The input means can be an external input means such as a separate keyboard or e.g. a remote control device integrated e.g. in a wristwatch. The external input means can be connected to the device via a slot, a wired connection or by a wireless connection such as Bluetooth.

Preferably, said input controller further comprises a timer. A timer enables the keypad controller to e.g. autonomously lock the keypad after a predetermined time following previous detected unlocking input or general input.

According to another aspect of the present invention, a keypad is provided that comprises an input controller as previously described. As keyboard and keypads nowadays are designed as integrated units on a single circuit board, a limited unlocking and auto-locking feature can be added to different electronic devices by simply applying a keyboard according to the present invention. The keyboard can be a built-in or an external keyboard or keypad.

According to another aspect of the present invention, an electronic device, e.g. mobile terminal device, is provided that is capable of executing the preceding methods for intermediate unlocking. The electronic device capable of intermediate unlocking comprises input means, and different user input states. The input states comprise a locked state, where the use of the input means is significantly restricted, and an unlocked state, where the use of the input means is not restricted, the locked state being enterable by a locking input, and the unlocked state being enterable by an unlocking input, and an intermediate unlocked state. The device further comprises means for entering said intermediate unlocked state based on user input, and means for detecting the termination or ending of a user operation in said intermediate unlocked state, the user operation being other than said locking input, and means to enter a locked state once said termination or ending has been detected. The electronic device can e.g. be an electronic terminal device, like a mobile telephone or a communicator, a PDA, a portable computer, or any other multi-purpose electronic device (desktop computer, home accessory, etc.). The intermediate lock feature can be integrated in single-purpose devices too. Multi-purpose devices benefit the most from the ability to execute the previously described limited unlocking and/or auto-locking of the whole device or only of single applications.

Advantageously, the electronic device further comprises a memory to store predefined inputs to lock, intermediate lock and unlock the device, or different terminations of user operations. With a memory for predefined inputs, the device can provide different and e.g. user selectable inputs to be used as an unlocking input sequence. The memory may be utilised to store auto-locking definitions as well.

Preferably, the electronic device further comprises a timer, for executing timer related detecting of termination or ending of user operations, as in the case of the input controller.

Preferably said user input required for entering said intermediate unlocked state is different from the unlocking input and the locking input, as described above, and comprises at least one predetermined key sequence.

BRIEF DESCRIPTION OF THE DRAWINGS

In the following, the invention will be described in detail by referring to the enclosed drawings in which.

DETAILED DESCRIPTION

Figure 1:
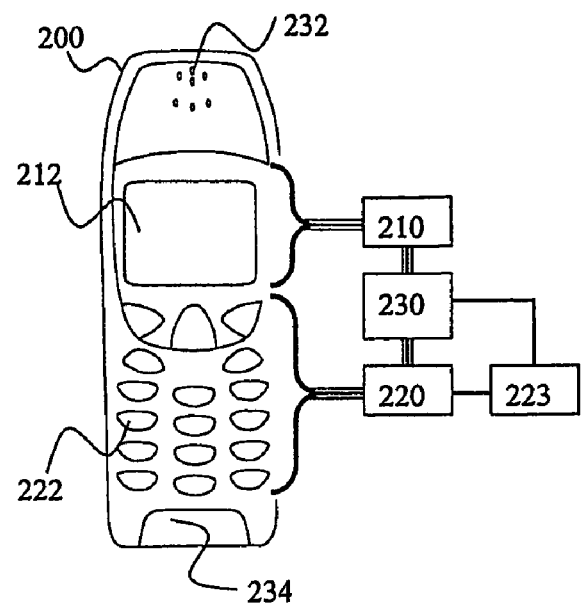
FIG. 1 is block diagram depicting a mobile telephone providing an intermediate unlocking feature according to one embodiment of the present invention.

FIG. 1 is block diagram depicting a mobile telephone 200 providing an intermediate unlocking feature according to one embodiment of the present invention. The mobile telephone 200 has a keypad 222, a display 212, a loudspeaker 232 and a microphone 234, like any usual mobile telephone, the keypad 222 is connected via the input or keypad controller 220 to a mobile or central processing unit MCU 230. The MCU 230 is connected via the display controller 210 to the display 212. The mobile telephone further comprises a memory 232, that is at least connected to the MCU 230, and that may be connected to the keypad controller 220. The MCU is further connected (not shown) to other telephone elements (not shown) such as e.g. baseband processing means, transmitters, receivers, antennas and the like. The connection between the keypad controller and the central processing unit is bi-directional.

The keypad controller 220 pre-processes input from the keypad 222 before transferring it to the MCU 230. The keypad controller 220 can lock or unlock the keypad 222, in dependence of input from the keypad 222, or of signals from the MCU 230. So if e.g. a user presses keys on the keypad 222 of the mobile phone, the keypad controller 220 transforms the input into digital code, readable by the MCU. The keypad controller can be enabled to lock the keypad if it detects a predetermined input sequence e.g. "menu-star" with the effect that the keypad controller does not forward further keypad input to the MCU 230, until the keypad controller 222 detects an unlocking sequence, e.g. "menu-star". The keypad controller may forward a signal to the MCU 230 indicating invalid input, so that the MCU 230 may forward a signal via the display controller 210 to the display 212 to depict e.g. a "keypad locked" sign or a respective text. The mobile telephone according to this embodiment of the invention is capable of recognising different unlock sequences leading to different accessibility of the device. In the embodiment depicted in the figure, the different unlocking sequences are stored in the memory 223, so the keypad controller 220 can recognise different input sequences without the need to contact the MCU 230 which can stay in e.g. in a low power mode, until it receives a signal from the keypad controller, that a certain unlocking code has been received.

The keypad controller 220 acts like a doorkeeper rejecting all except certain predefined inputs and only wakes up the MCU 230 if a certain input is recognised. The connection between the MCU 230 and the memory 223 enables the MCU to change the valid unlock sequences, and may be used to store information about the number of possible inputs and of the kind of granted access.

It is to be noted that the keypad controller 220 and the memory 223 may be embodied as a software application running on the MCU.

Figure 2:
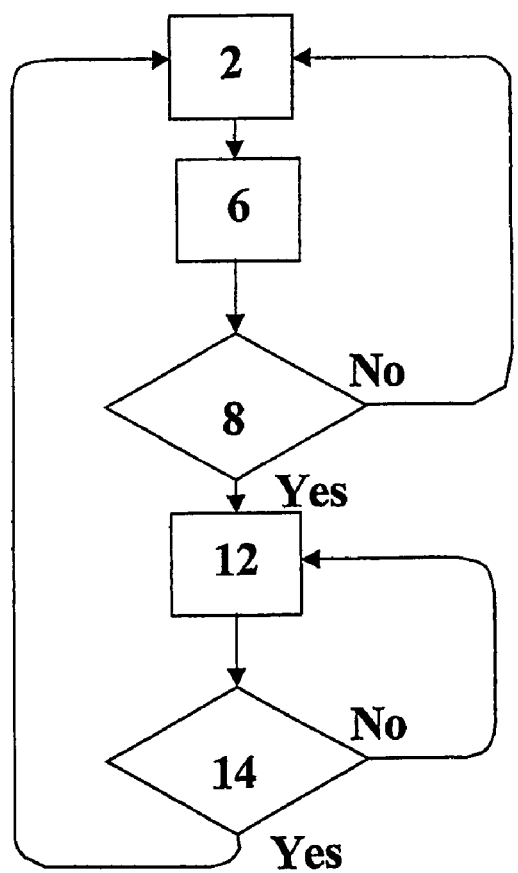
FIG. 2 is a flowchart of an intermediate unlocking algorithm of an electronic device according to one aspect of the present invention.

FIG. 2 depicts a flowchart of an intermediate unlocking of an electronic device. In step 2 the device is in a default key-locked state, like usually a mobile telephone carried in a pocket is. In step 46, the electronic device receives an input, e.g. from the telephone keyboard. In step 8 the input is checked for unlocking sequences. The input is preferably buffered before the checking, so that the entire input sequence can be written into a buffer before checking the input for (intermediate) unlocking sequences. If no unlocking sequence is found, the device returns to or stays in the locked state 2. If a general unlocking sequence is recognised, the general unlock is activated (not shown) until the general key-lock sequence is entered. If the checking operation 8 recognises a sequences of key-presses for intermediate unlocking of the electronic device, the electronic device enters the intermediate unlocked state 12. In the state 12 the device can receive different user input within predetermined limits. The limit can be e.g. the number of executable actions, operations or change of settings or the like. In the state 12, following to every input, it is checked 14, if the user operation has ended. If the user operation has not ended, the device returns in to the state of limited access 12. If the user operation has ended, the device is automatically locked and returns in to the locked state 2.

A classic unlock input sequence of an electronic device e.g. for NOKIA® mobile telephones is "menu-star". This sequence is the only combination of keys to unlock the phone in the locked state. The phone has 18 keys so the probability of a coincidental unlocking is 1 to 324. In practice the probability is even smaller, as 1 to 324 is the probability when two randomly selected keys are pressed successively. But when a mobile electronic device is carried e.g. in a pocket, and for some reason pressure is applied to the keypad, the probability that exactly two keys are pressed successively (and not the same time) is already quite small. The desired intermediate unlocking feature should not increase this probability significantly. The desired intermediate locking state can be entered e.g. by an additional key input not used by e.g. an other frequently used input like the menu key or an abbreviated dialling feature like the keys 0 to 9. The intermediate unlocking key sequence can be e.g. "menu-star-star", "menu-star-pound", "menu-menu-star", or generally "x-menu-star"", where x is any key. The intermediate unlocking key sequence can be simply "star-menu" or "menu-pound", wherein "#" is the "pound" sign. The pattern could be "hold menu-star", where the menu key must be held for 2 seconds. In the case of the first two three-step sequences "menu-star-star", "menu-star-pound", the sequence "menu-star" unlocks the electronic device and the following "star" or "pound key" activates the intermediate unlocked state. In the case of the two two-step sequences, the sequence "star-menu", or "menu-pound" directly enters the intermediate unlocked state of the electronic device. The three step sequences have the advantage that the probability of a coincidental unlock is the same as before, and the advantage of simpler implementation. The two step sequences have the advantage of faster unlocking.

When the intermediate unlocked state is in effect, the user can e.g. carry out one task, i.e. one sequence of key-presses, and when that sequence is completed, the keypad is automatically locked again. For example, when there is a new message, the user can press "menu-menu-star-menu" to view the message (if implemented, e.g. on NOKIA® mobile telephone 8310). In the sequences the double hyphen indicates the borderline between the unlock sequence and the input sequence for operations. A sign on the screen is used to indicate that the intermediate unlocked state is entered. When the user exits the message (red button or exit), the SMS menu is exited, and the keypad is locked.

To give another example, the user can press "menu-menu-star-2" to dial the first fast dial number, the keypad will be immediately locked, and if the user is using a headset, there is no problem dropping the phone into the pocket, since the keypad is locked. This option can be provided as NOKIA® headsets have a "receive and terminate phone calls" key, which is not locked automatically. To give yet another example, the user can press "menu-menu-star-power-power-power-menu" to enter silent mode and have the keypad automatically locked without having to remember locking it.

It is to be noted that the scope of the present invention is not limited to the described intermediate unlock sequences. The number of valid intermediate unlock input sequences can be e.g. two as mentioned in the description of FIG. 1. The number of valid intermediate unlock input sequences can be unlimited and be e.g. user selectable, so that e.g. a user can e.g. configure the telephone to accept "5-5-5" or "7-7-7" resembling a hissing sound e.g. as valid input sequence for unlocking and entering the game application "Snake" of a mobile telephone. The valid input sequence for unlocking can be combined with a "skip" functionality so as to economise further input for the limited access of e.g. a single application.

Figure 3A:
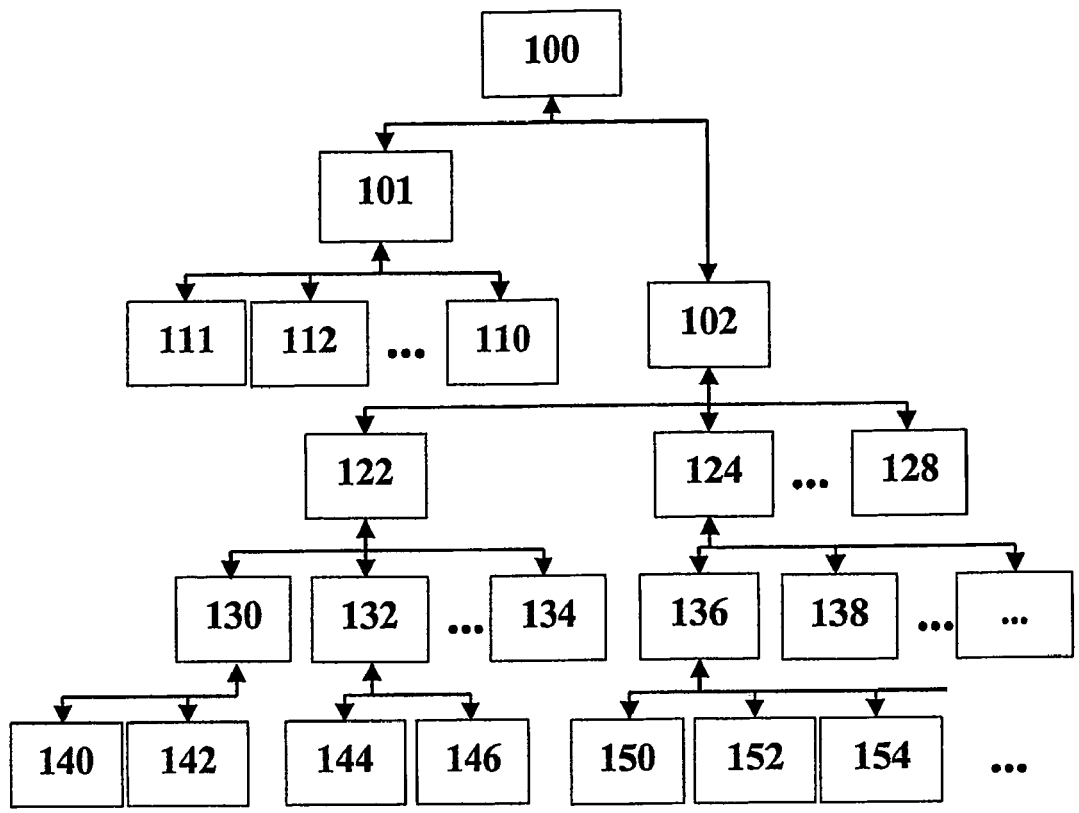
FIG. 3A is a diagram depicting a conventional menu input tree.

FIG. 3A is a tree diagram depicting a conventional menu input tree, wherein the standard operation state is depicted as the box 100. The state 100 is the standard operation state, with the main options of calling operations 101. The calling operations can be e.g. a "standard dialling operation" 111, an "abbreviated dialling operation" 112, a "dial last number", a "voice dialling operation" 110 or the like. The rectangle 102 indicates the state of an activated menu. The menu box 102 offers menu elements e.g. "voice box or voicemail box" 124, "messages" 122 "settings" 128 and the like. The menu "voice box" 124 further comprises e.g. the submenu items "voice box alert" 136, "voice box number" 138, "call voice box", and the like. Wherein "voice box alert" 136 comprises the submenus "alert on" 150 and "alert off" 152 and "vibration alert" 154 and further options. Wherein "voice box number" 138 comprises the submenus like "change number" and "confirm number". Wherein "call voice box" comprises no further submenu as the activation of "call voice box" starts the terminal operation of calling the voice box.

The menu messages 122 further comprises the sub menu items "inbox" 130, "outbox" 132, and "settings" 134. Wherein "inbox" 130 comprises the submenu items as "reply/forward" 140 and "read/delete" 142. Wherein "outbox" 132 comprises the submenu items as "send/edit" 144 and "read/delete" 146. Further submenus e.g. of 140, 142 are not depicted for the sake of clarity. The menu and submenu elements are connected with bi-directional arrows to indicate that the menu can be used in all directions, so that it is possible to return from a sub menu element back to the "master/mother" menu.

Figure 3B:
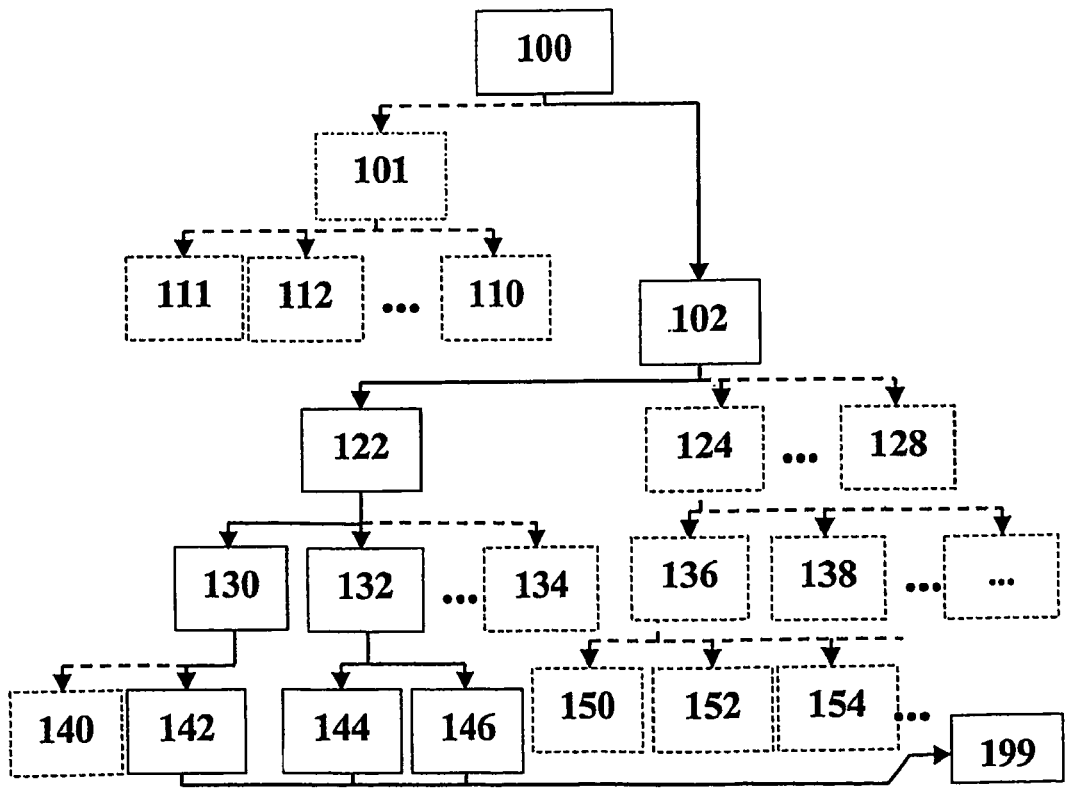
FIG. 3B is a diagram of the menu input tree of FIG. 3A with in the intermediate unlocked state with limited accessibility.

FIG. 3B is a tree diagram of the menu input tree of FIG. 2A in the case of an intermediate unlocked state with a limited accessibility, e.g. because of a limited unlocking of the electronic device. Basically, the menu structure is the same as in FIG. 2A. But there are three significant differences: the number of accessible menu elements is limited, the connections of the menus elements are mono-directional, and the terminal menu elements are connected to the box 199.

The number of accessible menu elements is restricted to certain operations, in the present case to the message menu. After an intermediate unlocking operation, the user can select the menu 102, further select the message menu 122, as in the case of the general unlocking. In difference to the state of a general unlocking the menu elements 101, 124, . . . ,128 are not accessible, and therefore depicted in dotted lines. These dotted menu elements are not accessible for reasons such as that the elements are irrelevant in the current state of the phone, that it could be resource consuming to activate them, and the like.

The use of menus can be restricted as the connections are directed from the menu to submenu, so that a user can select a submenu but can not return to the master/mother menu directly. This is indicated by the mono-directional arrows connecting the single menu elements.

All terminal menu elements are mono-directionally connected with the box 199. The box 199 is a locked state that is entered, if a terminal menu element is reached or the operation of a terminal menu element is completed.

The user benefits from the invention that he doesn't have to remember to lock the keypad after unlocking and using electronic devices. The invention improves the feel of the terminal by converting three-step operation of a quick task to a two-step operation: from "unlock keypad"—"perform task"—"lock keypad" to "unlock keypad"—"perform task". Moreover, the user is less likely to forget locking the keypad.

Figure 4:
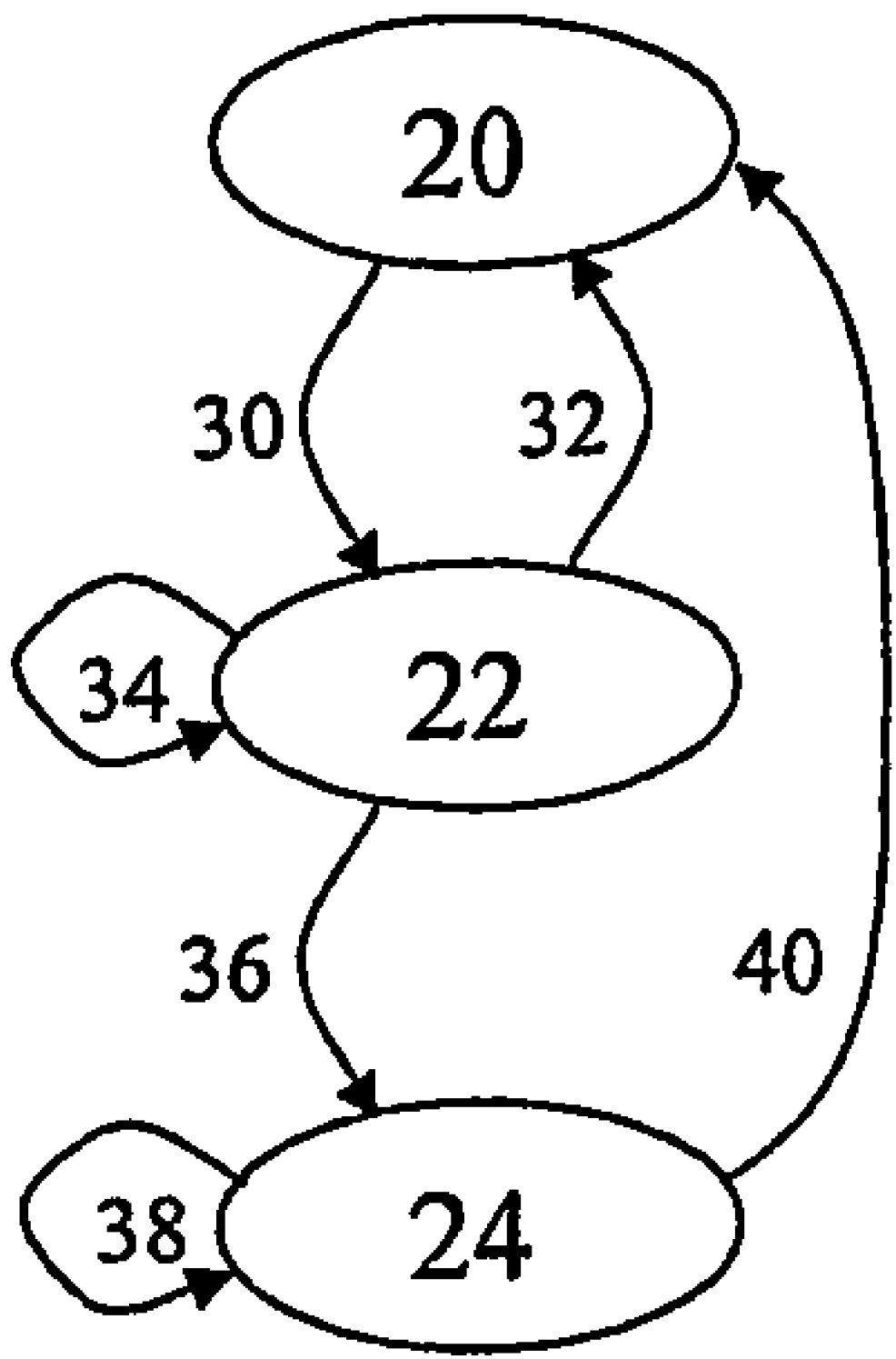
FIG. 4 is a flowchart illustrating the use of a the intermediate unlocking method according to another embodiment of the present invention.

FIG. 4 is a flowchart illustrating the use of an intermediate unlocking algorithm according to another embodiment of the present invention. The flowchart comprises three states: a locked state 20, an intermediate unlocked "select operation" state 22 and a "write short message" state 24. Starting from the locked state 20 a user can unlock the device by inputting an intermediate unlock key sequence in step 30, and reach the "select operation" state 22. In the state 22, the user can browse 34 e.g. a menu tree structure up and down different levels. In the state 22 the user can make more complicated operations than just once selecting something from a menu, and the user can move in the menu and there are not only one way inputs, to the "next level" in the hierarchy. There could be a possibility to go back and forth in the accessible parts of the menu (at least to some extent). In the state 22 the user can exit 32 the selection state 22 back to the locked state 20.

In the state 22 the user can select a "one way operation" by e.g. selecting 36 the "write short message" option 24. There can be other "one way" selectable operations such as change settings, change alarm tone and suchlike, these options are not depicted for the sake of clarity. In the state 24 the user can write a short message, or any arbitrary sequence of characters, and edit the message, in a "free text" mode indicated by the step 38. The user can send 40 the short message, and thereby entering the locked state of the device, and return to the locked state 20. The user can exit the state 24 by cancelling the action and can directly return to the locked state 20.

The invention complicates only slightly the implementation of the terminal, and the functions for which the intermediate unlock feature is used should be defined clearly to or by the user.

It should be noted that the method can be used for example with touchscreen displays. In this case there can be similar kind of feature that would allow only certain operations to be carried out. Starting with a "locked" touchscreen, a user opens the lock with the intermediate unlock code, and only the available softkeys are shown. These softkeys can be displayed as larger than in situations when the device is fully unlocked and all softkeys are visible. This feature can be used with voice commands, too. When the intermediate unlocked mode is activated, only certain commands may be executable. The device may indicate that only a limited number of voice commands are available in the limited unlocked state. With such a solution the detection accuracy can be improved since there are fewer possible commands that can be carried out in the limited unlocked state.

This application contains the description of implementations and embodiments of the present invention with the help of examples. It will be appreciated by a person skilled in the art that the present invention is not restricted to details of the embodiments presented above, and that the invention can also be implemented in another form without deviating from the characteristics of the invention. The embodiments presented above should be considered illustrative, but not restricting. Thus the possibilities of implementing and using the invention are only restricted by the enclosed claims. Consequently various options of implementing the invention as determined by the claims, including equivalent implementations, also belong to the scope of the invention.

The invention claimed is:

1. A method of changing the input states of an electronic device, having an input portion, the device capable of carrying out user operations, and the device having input states including a locked state, wherein the use of the input portion is significantly restricted, and an unlocked state, wherein the use of the input portion is not restricted comprising:

entering the locked state by a locking input,
entering the unlocked state by an unlocking input,
  entering an intermediate unlocked state of said electronic device, in which a limited operational use of said input portion is possible, from the locked state, based on an intermediate unlocking user input which is different from the unlocking input required for entering the unlocked state;
  detecting the termination of a user operation in said intermediate unlocked state, the user operation being other than said locking input and including the completion of at least one task by a number of input operations greater than one; and
  entering said locked state, in response to said detection.

2. A computer program product comprising program code stored on a computer readable medium for carrying out the method of claim 1 when said program code is run on an electronic device.

3. A mobile electronic device comprising:

an input portion;
different user input states, the input states including a locked state, where the use of the input portion is significantly restricted, said locked state being enterable by a locking input, and an unlocked state, where the use of the input portion is not restricted, said unlocked state being enterable by an unlocking input,
  an intermediate unlocked state in which a limited operational use of said input portion is possible,
wherein the electronic device is
  adapted to enter the intermediate unlocked state based on an intermediate unlocking user input which is different from the unlocking input required for entering the unlocked state;
  adapted to detect the termination of a user operation in said intermediate unlocked state, the user operation being other than said locking input and including the completion of at least one task by a number of input operations greater than one; and
  adapted to enter said locked state in response to said detection.

4. The mobile electronic device according to claim 3, further comprising a memory to store locking, unlocking and intermediate unlocking inputs.

5. The mobile electronic device according to claim 4, further comprising a timer.

6. The mobile electronic device according to claim 3, further comprising a timer.

7. A mobile electronic device comprising:

means for user input;
means for providing different user input states, the input states including a locked state, where the use of the means for user input is significantly restricted, said locked state being enterable by a locking input, and an unlocked state, where the use of the means for user input is not restricted, said unlocked state being enterable by an unlocking input, and an intermediate unlocked state in which a limited operational use of said means for user input is possible,
means for entering the intermediate unlocked state based on an intermediate unlocking user input which is different from the unlocking input required for entering the unlocked state;
means for detecting the termination of a user operation in said intermediate unlocked state, the user operation being other than said locking input and including the completion of at least one task by a number of input operations greater than one; and
means for entering said locked state in response to said detection.

* * * * *